(12) United States Patent
Dilone

(10) Patent No.: US 8,901,442 B1
(45) Date of Patent: Dec. 2, 2014

(54) LUGGAGE INCORPORATING A WEIGHT DETERMINATION MECHANISM AND LOCATION DETERMINATION SYSTEM

(71) Applicant: Guillermo Dilone, New Hyde Park, NY (US)

(72) Inventor: Guillermo Dilone, New Hyde Park, NY (US)

( * ) Notice: Subject to any disclaimer, the term of this patent is extended or adjusted under 35 U.S.C. 154(b) by 43 days.

(21) Appl. No.: 13/856,171

(22) Filed: Apr. 3, 2013

(51) Int. Cl.
  *G01G 21/28* (2006.01)
  *A45C 13/00* (2006.01)

(52) U.S. Cl.
  CPC .................................... *A45C 13/001* (2013.01)
  USPC ........... 177/238; 177/127; 177/245; 190/115; 190/127; 206/278

(58) Field of Classification Search
  USPC ......... 16/114.1; 177/126, 127, 180, 238, 245, 177/264; 190/100, 115, 122–127; 206/278, 206/459.1
  See application file for complete search history.

(56) References Cited

U.S. PATENT DOCUMENTS

| | | | |
|---|---|---|---|
| 4,055,239 A * | 10/1977 | Weiner | 190/126 |
| 5,671,831 A * | 9/1997 | Chiu | 190/127 |
| 6,244,399 B1 * | 6/2001 | Birkestrand | 190/127 |
| 7,084,357 B2 | 8/2006 | Roberts et al. | |
| 7,161,097 B1 * | 1/2007 | Gorgone | 177/245 |
| 7,281,615 B2 | 10/2007 | Siwak et al. | |
| 7,378,604 B2 | 5/2008 | Truong | |
| 7,501,591 B1 | 3/2009 | Muniz et al. | |
| 7,692,107 B1 | 4/2010 | Shotey et al. | |
| 7,789,225 B2 * | 9/2010 | Whiteis | 206/6.1 |
| 8,344,271 B1 | 1/2013 | Falk, Jr. | |
| 2006/0054364 A1 | 3/2006 | Kamakau | |
| 2006/0196708 A1 | 9/2006 | Keech et al. | |
| 2012/0241269 A1 * | 9/2012 | Sheikh | 190/115 |
| 2012/0241270 A1 | 9/2012 | Sudu | |

FOREIGN PATENT DOCUMENTS

| | | |
|---|---|---|
| TW | 20111746 | 6/2011 |
| WO | WO2006/101709 | 9/2006 |

* cited by examiner

*Primary Examiner* — Luan K Bui
(74) *Attorney, Agent, or Firm* — Michael I. Kroll

(57) ABSTRACT

The present invention is a smart luggage having an outer case and an inner case with a weight determination mechanism therebetween in electrical communication with a circuit having firmware and an exterior electronic display. The circuit further incorporates a GPS locator and a transponder, whereby a user having a mobile device enabled with tracking software may be able to locate and retrieve lost or stolen luggage. Also provided within the smart luggage is a camera that can take one or more pictures when the smart luggage is opened by a person.

7 Claims, 7 Drawing Sheets

LUGGAGE INCORPORATING A WEIGHT DETERMINATION MECHANISM AND LOCATION DETERMINATION SYSTEM

BACKGROUND OF THE INVENTION

1. Field of the Invention

The present invention relates generally to luggage and, more specifically, to smart luggage comprising an outer case having an inner case with a weight determination mechanism therebetween in electrical communication with a circuit having firmware and an exterior electronic display. Said circuit further incorporates GPS determination and transponder whereby a smart luggage user having a mobile device enabled with tracking software may be able to locate and retrieve lost or stolen luggage. Also provided within the smart luggage is a camera that can take one or more pictures when the smart luggage is opened of the person opening the luggage.

2. Description of the Prior Art

There are other suitcases that provide for displaying the weight of the case. While these suitcases may be suitable for the purposes for which they where designed, they would not be as suitable for the purposes of the present invention as heretofore described.

It is thus desirable to provide luggage that will progressively compare the weight of articles as they are packed within said luggage to a predetermined index weight and display to the user an indicator of whether the weight of articles is less than or greater than the index weight.

It is further desirable to provide luggage having GPS determination software whereby a user having a smart phone enabled with tracking software may be locate lost or stolen luggage.

It is additionally desirable to provide baggage having a camera that will capture one or more images of one or more individuals having opened the baggage. This option not only identifies those authorized people performing security tasks but also provides a measure of security with lodging establishments.

SUMMARY OF THE PRESENT INVENTION

The luggage consists of an outer and inner container with the inner container isolated from the outer container except through a weight measuring device. The weight recorded by the weight measuring device will not include the weight of the outer container and its peripherals. The intention is to add the 'constant' weight of the external container to the weight measured by the weight measuring device via a constant introduced in the system software. It is also theorized that if the standard deviation of this weight is large that the PCB will possess the ability for the constant to be changed during production.

Located between the inner and outer containers will be a series of friction reduction strips. The objective of these strips is to aid in the isolation of the inner and outer containers. During the packing process of the luggage, there will be an uncontrolled increase in pressure placed on the sides of the internal container. The very low friction coefficients of the strips are expected to result in very low resistive forces. Regardless, these resistive forces will combine with the gravitational weight and be registered by the weight measuring device. With this understood it is expected that these forces will be predictable and repetitive for given content weight and will be allotted for in the readout by predetermined algorithms contained within the systems firmware.

Located between the bottoms of the inner and outer containers is the weight measuring device. This device will consist of a piezoresistive force sensor, preferably Tekscan® Flexiforce® sensors, sandwiched between pressure plates. The pressure plates provide surfaces of required stiffness to allow the luggage to be placed on any surface during packing and still provide an accurate readout. These plates will also provide for proper and consistent interface with the Flexiforce® sensors.

All Electro-mechanical systems possess inherent error within the system. The Flexiforce® sensor system is not different in this regard. Error in linearity, hysteresis and drift are all present to some degree within this system. This system will NOT read out actual weight but merely a readout that additional items can be 'ADD'ed or when the luggage is 'FULL' due to the very nature of the smart luggage system that indicates when a certain weight threshold has been violated. By configuring the system in this fashion the system error will be significantly reduced.

Most system errors are a function of the range of values the system must work within. For instance; if we were to develop a system that measures the weight within a range from 10 to 50 lbs or 40 lbs, with a system error of ±10%, the system error could be ±4 lbs which would unacceptable for this product. Therefore, by adopting the threshold methodology we need only to measure between 47 and 51 lbs or a range of 4 lbs, thereby having only a ±0.4 lb error which is certainly more acceptable.

A primary object of the present invention is to provide smart luggage that will aid a user during packing by continuously indicating whether the weight of added luggage articles is below or above a programmed index weight.

Another object of the present invention is to provide smart luggage comprising an outer case and an inner case having a weight measuring device therebetween.

Yet another object of the present invention is to provide smart luggage having a plurality of low friction coefficient strips mounted to the interior walls of the outer case providing low resistive forces between the outer and inner case.

Still yet another object of the present invention is to provide smart luggage wherein said weight determination mechanism is a piezoresistive force sensor.

An additional object of the present invention is to provide smart luggage with a pair of sufficiently rigid pressure plates having the piezoresistive force sensor therebetween allowing the luggage to be placed on any surface during packing and still provide an accurate readout.

A further object of the present invention is to provide smart luggage with a visual display in electrical communication with a comparator circuit incorporating said piezoresistive force sensor whereby an indicator can be displayed on said visual indicator denoted whether the baggage contents are above or below a predetermined index weight.

A yet further object of the present invention is to provide smart luggage having GPS determination software whereby a user having a mobile phone enabled with tracking software may be able to locate and recover lost or stolen baggage.

A still yet further object of the present invention is to provide smart luggage having an interior camera that can capture one or more images of individuals opening the luggage.

Another object of the present invention is to provide smart luggage further comprising an audio circuit that will enunciate the comparator weight results.

Additional objects of the present invention will appear as the description proceeds.

The present invention overcomes the shortcomings of the prior art by providing luggage having an outer case and an inner case with a weight determination mechanism therebetween in electrical communication with a circuit having firmware and an exterior electronic display. Said circuit further incorporates GPS determination and transponder whereby a smart luggage user having a mobile device enabled with tracking software may be able to locate and retrieve lost or stolen luggage. Also provided within the smart luggage is a camera that can take one or more pictures when the smart luggage is opened of the person opening the luggage.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
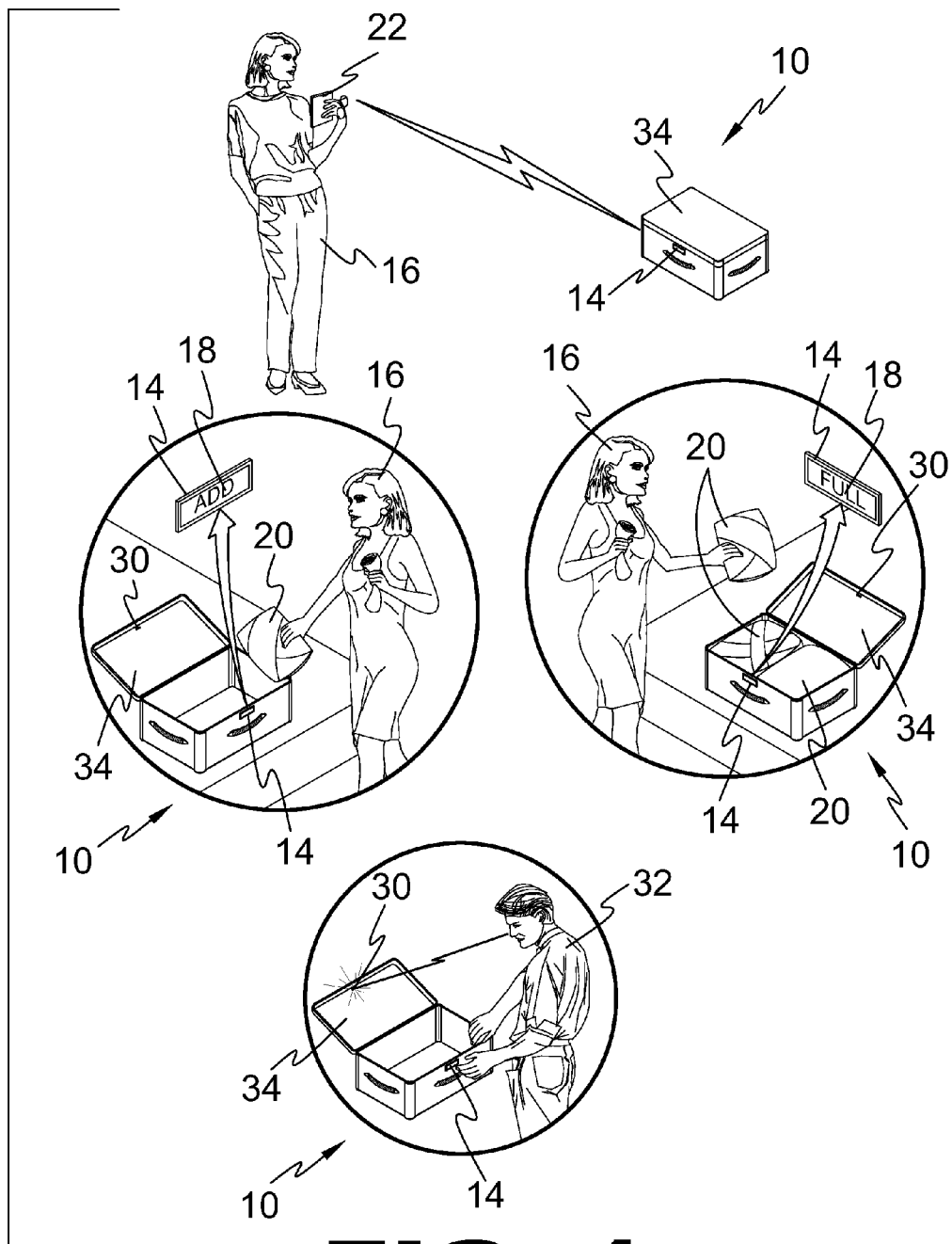
FIG. 1 is an illustrative view of the smart luggage of the present invention in use.

Turning now descriptively to the drawings, in which similar reference characters denote similar elements throughout the several views, the Figures illustrate the luggage incorporating a weight determination mechanism and location determination system of the present invention. With regard to the reference numerals used, the following numbering is used throughout the various drawing figures.

10 smart luggage
12 weight measuring device in luggage 10
14 display in luggage 10
16 user
18 indicator in display 14
20 article
22 remote electronic component for luggage 10
24 circuit in luggage 10
26 transponder in luggage 10
28 GPS locator in luggage 10
30 digital camera in lid 34
32 person
34 lid of luggage 10
36 outer container of luggage 10
38 inner container of luggage 10
40 friction reducing strip in luggage 10
42 piezoresistive force sensor in device 12
44 pressure plate in device 12

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Referring to FIG. 1, shown is an illustrative view of the smart luggage of the present invention in use. The present invention is smart luggage 10 incorporating a weight measuring device 12 and display 14 that will aid a user 16 by either visually displaying a status indicator 18 on the display 14 whether the poundage of articles 20 placed within the luggage 10 exceeds a predetermined index weight and/or will audibly enunciate the status. For illustrative purposes only, the indicator 18 is shown as visually displaying 'ADD' or 'FULL' but is not limited to such. Furthermore, the present invention provides for a remote electronic device 22 and the luggage 10 having a circuit 24 incorporating a transponder 26 and a GPS locator 28, whereby when the luggage 10 is lost or stolen it can be recovered. An internal digital camera 30 will photograph a person 32 opening a lid 34 of the luggage 10 once closed by the user 14.

Figure 2:
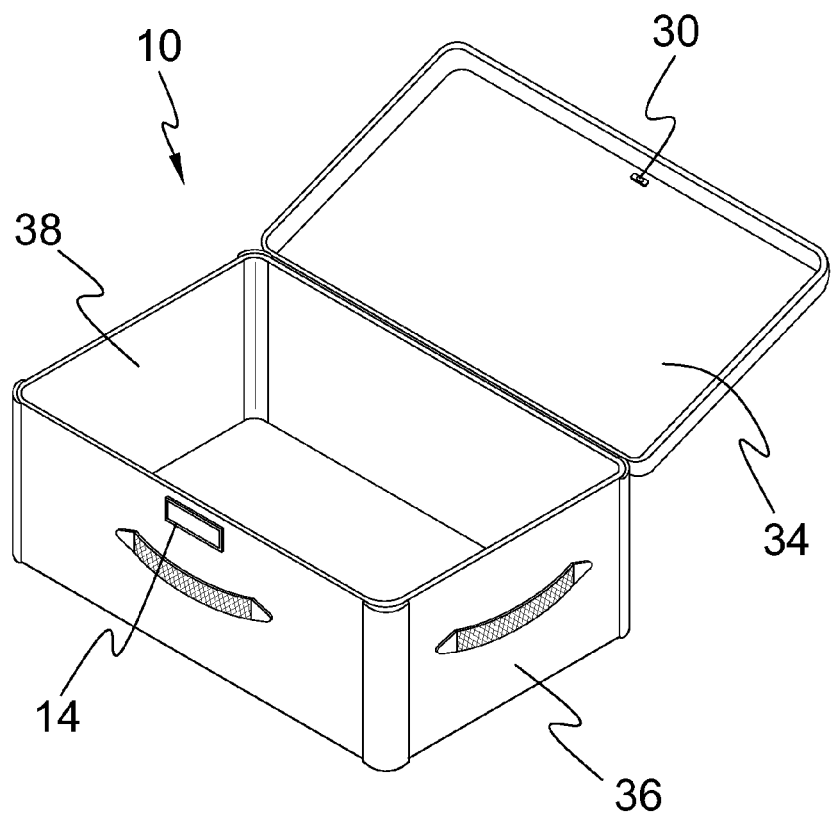
FIG. 2 is a perspective view of the smart luggage of the present invention.

Referring to FIG. 2, shown is a perspective view of the smart luggage of the present invention. Shown is an internal view of the smart luggage 10 of the present invention having an outer container 36 holding an inner container 38 with the inner container 38 isolated from the outer container 36 by a weight measuring device 12. The weight recorded by the weight measuring device 12 does not include the weight of the outer container 36 and its peripherals. The invention adds the "constant" weight of the outer container 36 to the weight measured by the weight measuring device 12 through a constant weight introduced in the system software.

Figure 3:
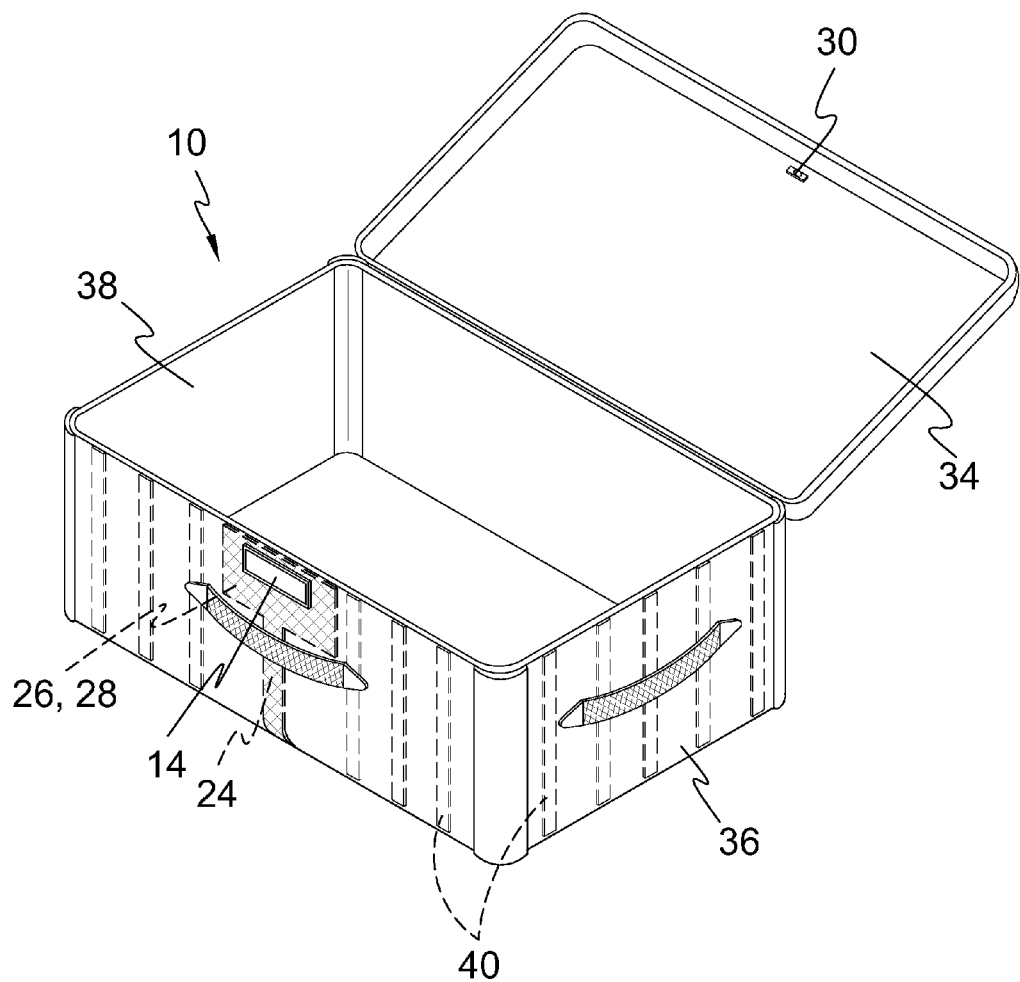
FIG. 3 is a perspective view of the smart luggage of the present invention.

Referring to FIG. 3, shown is a perspective view of the smart luggage of the present invention. Illustrated is the smart luggage 10 having an outer container 36 holding an inner container 38 with a plurality of friction reducing strips 40 situated between the inner container 38 and outer container 36 to aid in the isolation of the inner container 38 from the outer container 36.

Figure 4:
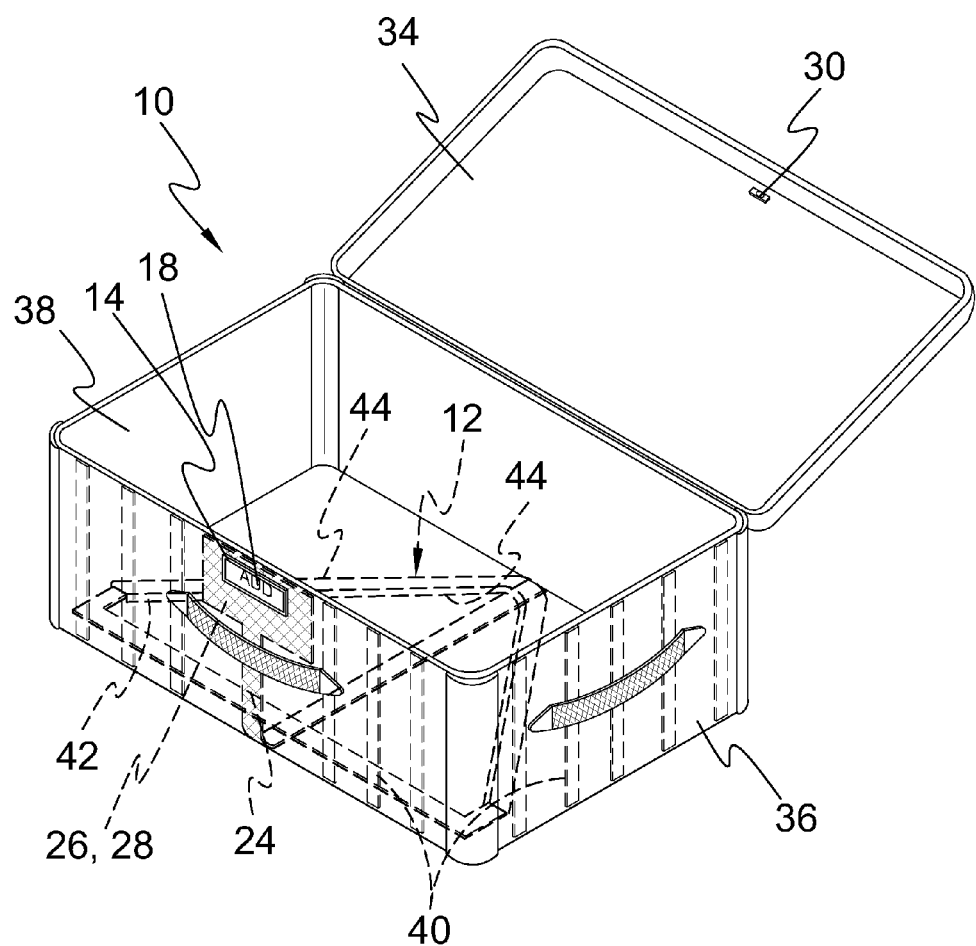
FIG. 4 is a perspective view of the smart luggage of the present invention.

Referring to FIG. 4, shown is a perspective view of the smart luggage of the present invention. Located between the bottoms of the inner and outer containers 38,36 is the weight measuring device 12. Te device 12 consists of a piezoresistive force sensor 42, preferably a Tekscan® Flexiforce® sensor, positioned between pressure plates 44. The pressure plates 44 provide surfaces of required stiffness to allow the luggage 10 to be placed on any surface during packing and still provide an accurate read out. The plates 44 will also provide for proper and consistent interface with the piezoresistive force sensor 42.

Figure 5:
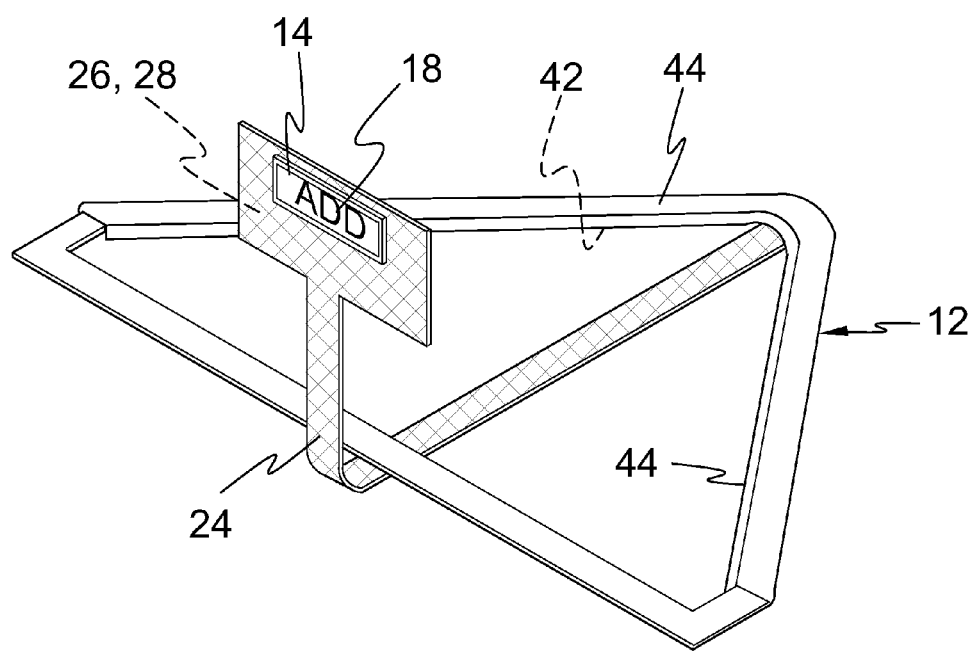
FIG. 5 is a perspective view of the smart luggage weight determination mechanism.

Referring to FIG. 5, shown is a perspective view of the smart luggage weight determination mechanism. Located between the bottoms of the inner and outer containers 38,36 is the weight measuring device 12. The device 12 consists of a piezoresistive force sensor 42, positioned between pressure plates 44. The pressure plates 44 provide surfaces of required stiffness to allow the luggage 10 to be placed on any surface during packing and still provide an accurate read out.

Figure 6:
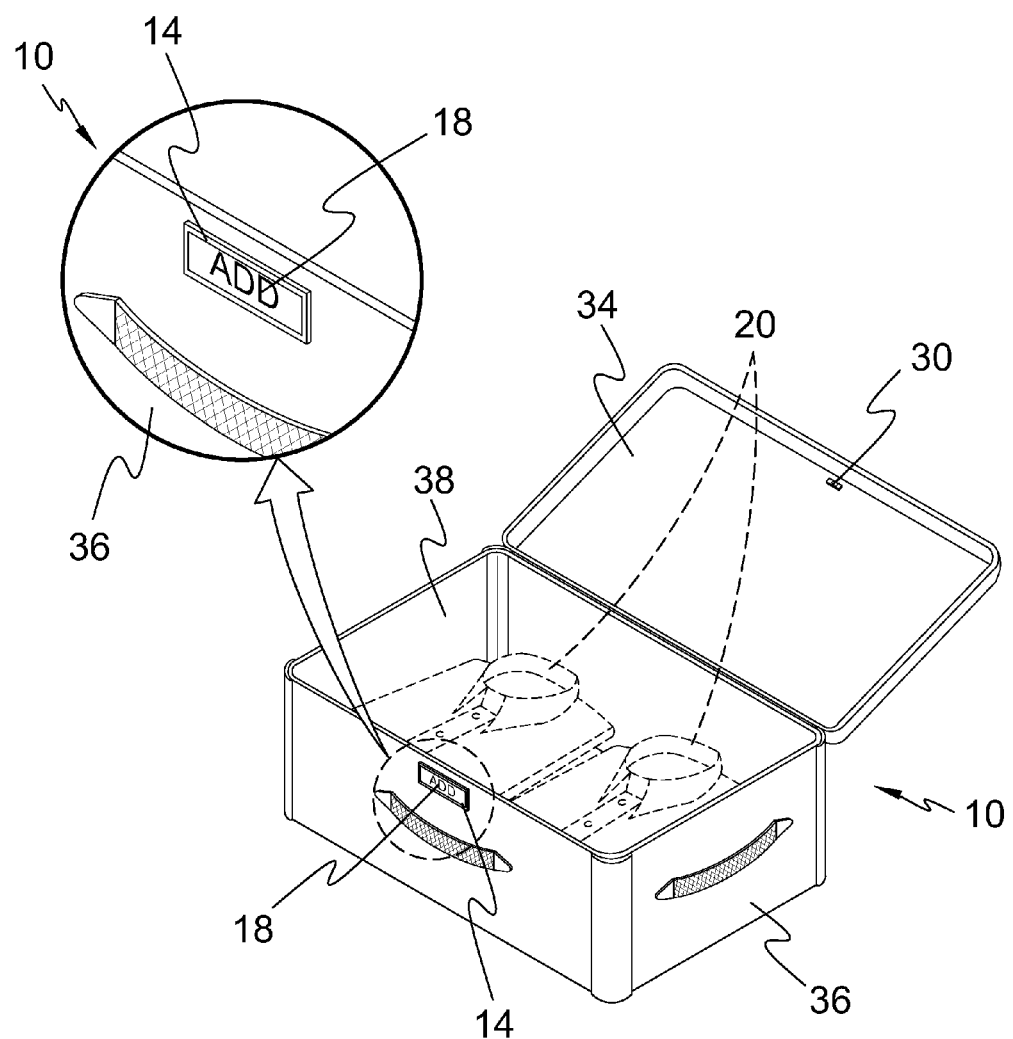
FIG. 6 is an illustrative view of the smart luggage in use.

Referring to FIG. 6, shown is an illustrative view of the smart luggage in use. To avoid overweight baggage fees, the present invention provides luggage 10 enabled with a weight measuring device 12 in communication with a display 14 providing a visual and/or audio indicator 18 as to whether the luggage articles 20 weigh less than or more than a preprogrammed index weight. As illustrated, the display 14 indicates that the luggage articles 20 weigh less than the index weight.

Figure 7:
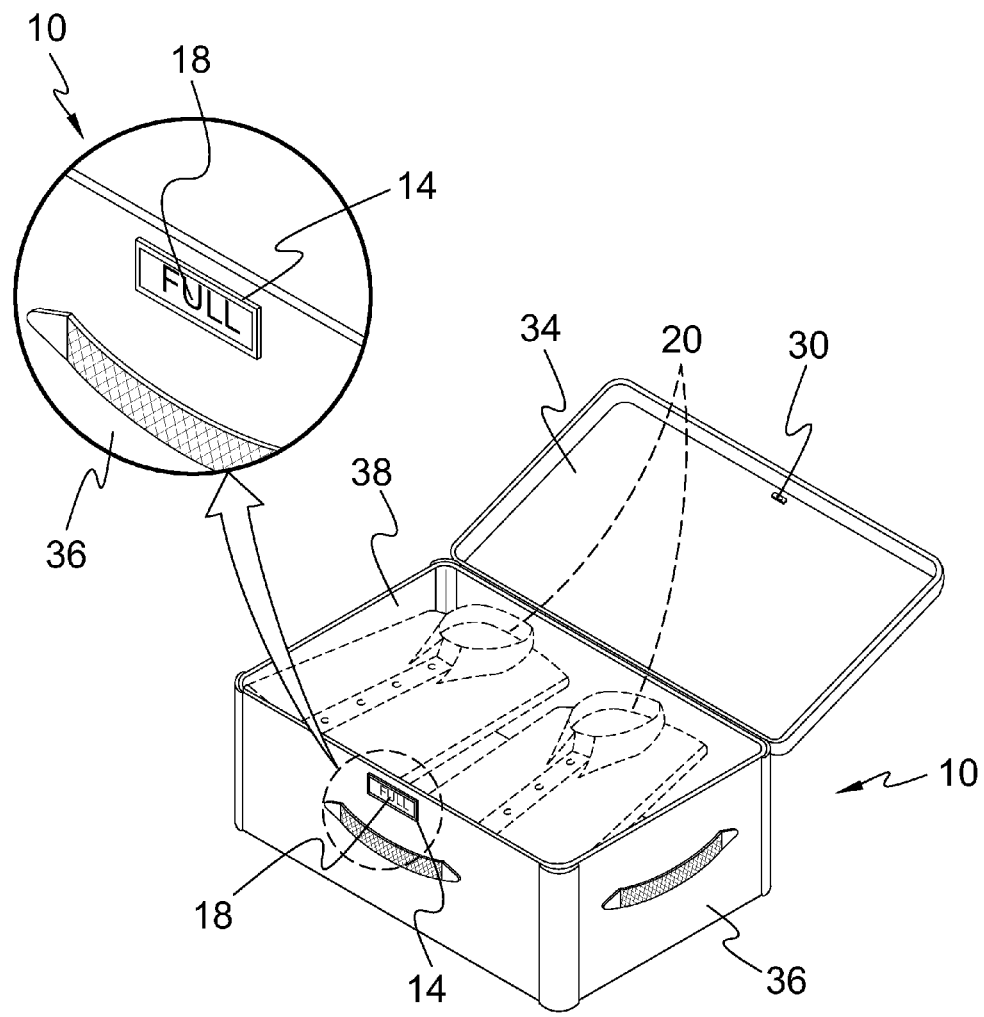
FIG. 7 is an illustrative view of the smart luggage in use.

Referring to FIG. 7, shown is an illustrative view of the smart luggage in use. The present invention provides the luggage 10 enabled with a weight measuring device 12 communication with a display 14 providing a visual and/or audio indicator 18 as to whether the luggage articles 20 weigh less than or more than a preprogrammed index weight. As illustrated, the display 14 indicates that the luggage articles 20 weight is substantially equal to that of the index weight.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

What is claimed is:

1. A smart luggage comprising:
   a) an outer container having a bottom wall and four vertical walls;
   b) a lid hinged to one of the vertical walls of the outer container;
   c) an inner container having a bottom wall and four vertical walls carried within the outer container;
   d) a weight measuring device located between the bottom walls of the outer container and the inner container;
   e) a display having an indicator, mounted on one wall of the outer container and electrically connected to the weight measuring device, whereby when a user places articles within the inner container the display will activate the indicator to alert the user whether the weight of the articles either exceeds/matches a predetermined index weight;
   f) a circuit electrically connected to the weight measuring device;
   g) a GPS locator electrically connected to the circuit;
   h) a transponder electrically connected to the GPS locator; and
   i) a remote electronic component operated by the user to receive a signal from the transponder, whereby when the smart luggage is lost/stolen it can be recovered.

2. The smart luggage as recited in claim 1, further comprising a plurality of friction reducing strips, spaced apart and affixed vertically to inner surfaces of the vertical walls of the outer container to aid in the isolation of the inner container from the outer container.

3. The smart luggage as recited in claim 1, further comprising a digital camera attached to a bottom surface of the lid, whereby the digital camera will photograph a person when opening the lid of the outer container once closed by the user.

4. The smart luggage as recited in claim 1, wherein the weight measuring device comprises:
   a) piezoresistive force sensor; and
   b) a pair of pressure plates that are positioned between the piezoresistive force sensor to provide surfaces of required stiffness, to allow the outer container to be placed upon any surface during packing of the articles within the inner container and still produce an accurate readout on the display.

5. The smart luggage as recited in claim 1, wherein the display is a visual display.

6. The smart luggage as recited in claim 1, wherein the display is an audible display.

7. The smart luggage as recited in claim 1, wherein the remote electronic component is selected from a group consisting of a laptop, a computer, a smart phone and a tablet.

\* \* \* \* \*